United States Patent [19]

Snyder et al.

[11] Patent Number: 4,976,159

[45] Date of Patent: Dec. 11, 1990

[54] DUAL MODE TORQUE WRENCH

[75] Inventors: Robert F. Snyder, Hamden; John H. Ferguson, Rocky Hill; Jesse R. Meisterling, East Hampton; David S. Fishman, West Hartford, all of Conn.

[73] Assignee: Raymond Engineering Inc., Middletown, Conn.

[21] Appl. No.: 419,682

[22] Filed: Oct. 11, 1989

[51] Int. Cl.[5] ........................ B25B 23/142; G01L 5/24

[52] U.S. Cl. ................................ 73/862.21; 73/862.31

[58] Field of Search .......................... 73/862.21, 862.31

[56] References Cited

U.S. PATENT DOCUMENTS 3,683,686 8/1972 Sergan .

4,212,196 7/1980 Krieger et al. .................... 73/862.21

4,213,333 7/1980 Krieger et al. .................... 73/862.31

4,549,438 10/1985 Grabovac et al. .

4,665,756 5/1987 Snyder .

*Primary Examiner*—Charles A. Ruehl

*Attorney, Agent, or Firm*—Fishman, Dionne & Cantor

[57] ABSTRACT

A torque wrench is presented which has dual output/-reaction modes, with the input and output operating in the same direction in both modes. In one mode, a stationary reaction adapter is outside of an inner rotating torque adapter; in the second mode, a stationary reaction adapter is inside of an outer rotation torque adapter. Torque levels are measured by strain gages mounted on a single reaction arm and are read out digitally.

18 Claims, 5 Drawing Sheets

F/G. 2

DUAL MODE TORQUE WRENCH

BACKGROUND OF THE INVENTION

This invention relates to torque wrenches. More particularly, this invention relates to gear driven torque wrenches which have an input connected through a gear system to an output and a reaction member for grounding the wrench during operation. Such wrenches are typically manually operated by means of a crank or the like at the input, and such wrenches may be referred to herein as manually operated wrenches. It will, however, be understood that such wrenches may also be operated by means of power assist at the input, such as air or electrically driven inputs, and any such power assisted input is also within the scope of the invention of this application.

A well known and typical manually operated power wrench of the prior art is shown in U.S. Pat. No. 3,683,686 to Sergan which is assigned to Raymond Engineering Inc.,the assignee hereof. That wrench is commercially available from Raymond Engineering Inc. as the mold PD 1201 wrench. In the normal operation of the Raymond PD 1201 wrench, the wrench is grounded for reaction by the grounding pins (24, 26) at the bottom of the wrench, and the input is by means of a crank or other drive mechanism to the input socket (44). With the wrench of the Sergan patent, and other mechanical torque wrenches of that general type, the rotation of the output socket (40) of the wrench (i.e., the direction of rotation of the output) is in the same direction as the input. However, some situations are encountered where, because of the arrangement and location of parts to be torqued, it is necessary to ground the wrench for reaction at the output socket and torque the part to be torqued by rotation of the body of the wrench. Connection between the wrench body and the part to be torqued is then effected by means of an adapter connected to what would normally be the reaction pins; and an adapter is typically required to connect the output socket to a grounded location for reaction. This mode of operation will be referred to herein as a reverse mode of operation.

A particularly troublesome problem when the wrench is operated in the reverse mode described above (i.e., when grounding is through the normal output socket and torquing is accomplished via the normal reaction pins) is that the output of the wrench is in the reverse direction of the input. In normal operation of the wrench, a clockwise input (typical for tightening) will result in a clockwise output, and the operator has the comfortable feeling that he has a direct and natural connection to the part being torqued. However, when the wrench is operated in the reverse mode, the input and output directions are reverse to each other. That is, a clockwise input (normal for tightening) will result in a counterwise rotation of the wrench case (i.e., a reaction opposite to the grounding load). Therefore, when the wrench is operated in the reverse mode, the operator must input in the counterclockwise mode (i.e., opposite to normal operation) to effect torquing operation to tighten an element. This requirement to input in the direction reverse to the normal input produces operator confusion and error and has resulted in broken adapters and stripped threads. There is, therefore, a need for a dual mode wrench where the input and output are in the same direction regardless of the mode of operation.

SUMMARY OF THE INVENTION

The present invention solves the prior art problem discussed above by means of a dual mode wrench wherein the input and output are in the same direction regardless of the mode of operation of the wrench. In accordance with the present invention, in one mode of operation the wrench is grounded by conventional reaction pins either directly or via an adapter extending from the reaction pins at the bottom of the wrench. In this first mode, torque output is by means of the output socket located inboard of the reaction location. In the second mode of operation, reaction is by means of an adapter which extends through the wrench inboard of the output to react via pins grounded to the top of the wrench casing, and the output is located outboard of the reaction adapter. In either mode, the output is in the same direction as the input, thereby overcoming the prior art problems discussed above.

In accordance with another feature of the present invention, the torque load is sensed and measured by a torque measuring system comprising a single reaction arm with strain gages mounted on the reaction arm. While prior art wrenches have used two reaction arms (see, e.g., Sergan Patent 3,683,686), and while strain gage versions of the wrench of the Sergan patent with a two reaction arm system have also been proposed (see Grabovac et al Patent No. 4,549,438), and while a single reaction arm system has been proposed for small torque load wrenches of around 300 ft/lbs (see Snyder U.S. Pat. No. 4,665,756, assigned to the assignee hereof), a single reaction arm strain gage system of the type disclosed in this invention has not heretofore been proposed or thought to be feasible for a high torque wrench (about 1500 ft/lbs) of this type.

The above discussed features and advantages will be apparent to and understood by those skilled in the art from the following detailed description and drawings.

BRIEF DESCRIPTION OF THE DRAWINGS

Referring now to the drawings, wherein like elements are numbered alike in the several figures.

DESCRIPTION OF THE PREFERRED EMBODIMENT

Figure 1:
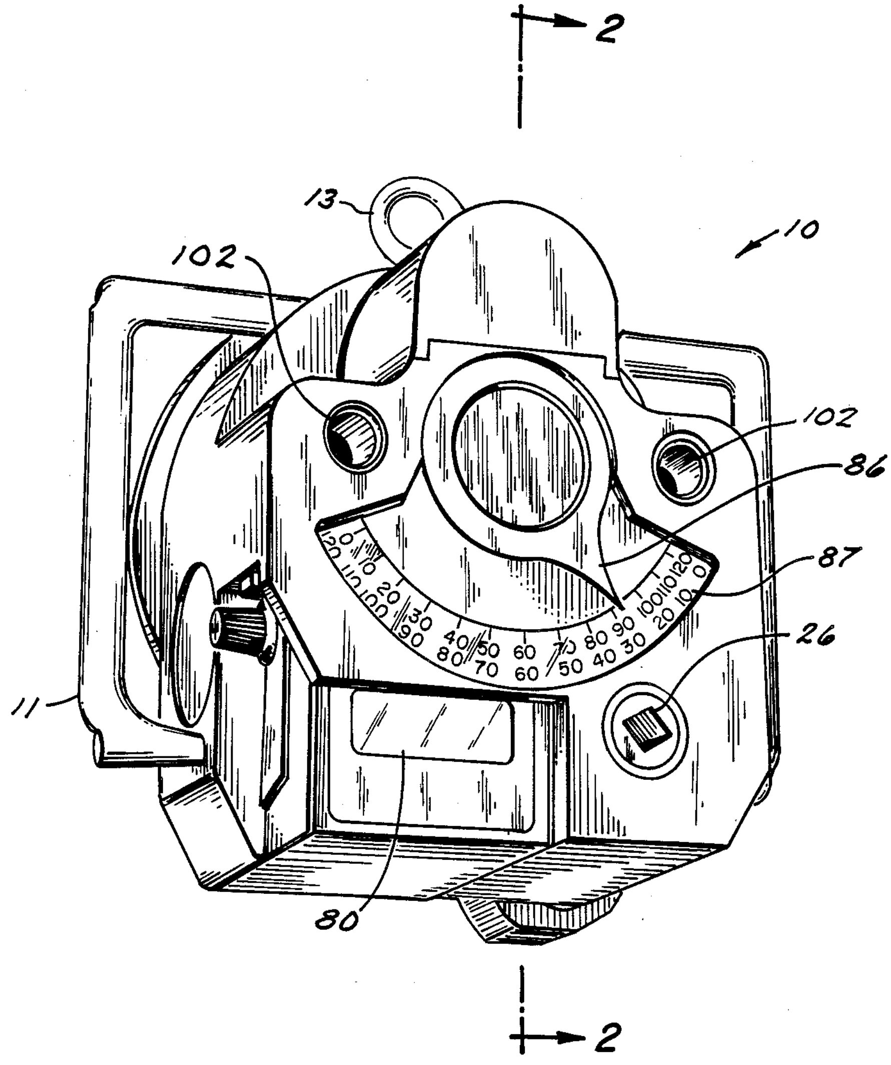
FIG. 1 is a perspective view of the wrench of the present invention.
Figure 2:
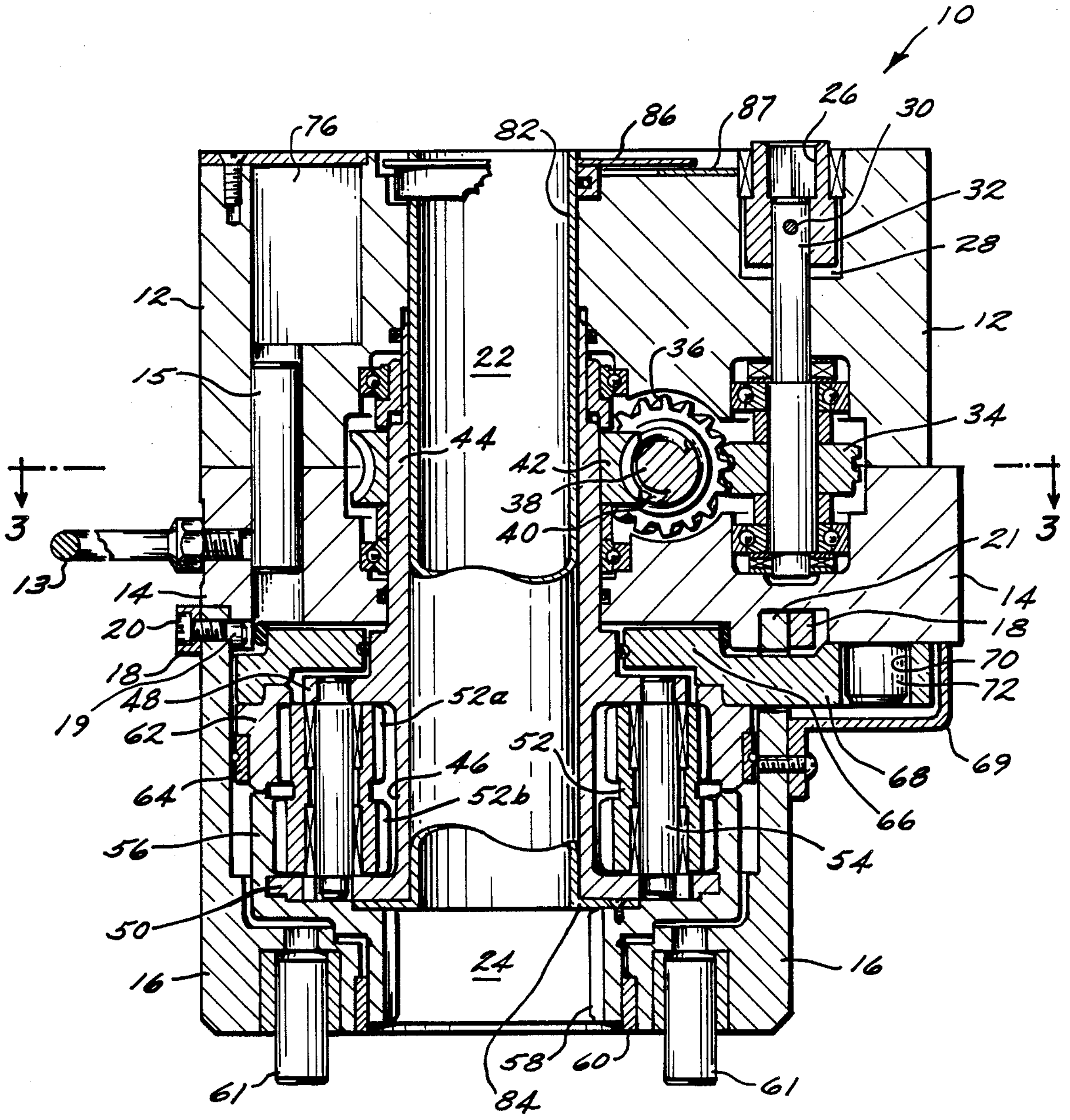
FIG. 2 is a sectional elevation view taken along line 2—2 of FIG. 1.
Figure 3:
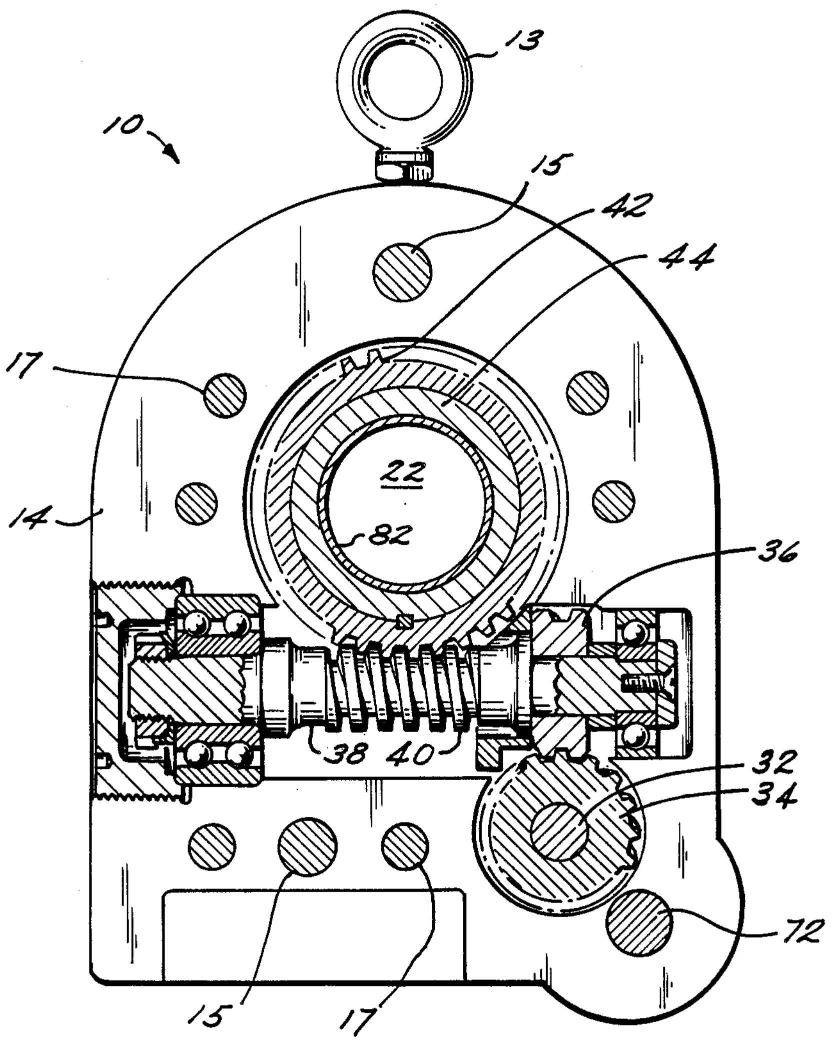
FIG. 3 is a sectional plan view taken along line 3—3 of FIG. 2.

Referring to a combined consideration of FIGS. 1, 2 and 3, the wrench 10 has a first, second and third housing segments 12, 14 and 16, respectively. Housing segments 12 and 14 are held together by cap screws 17. The first and second housing segments 12 and 14 are aligned and maintained in relative rotational position by dowel pins 15 which sit in passageways in the two housing parts. Housing segments 14 and 16 are held together by a series of circumferentially spaced radially directed dowel pins 19 extending through the overlapping parts of housing segments 14 and 16. A reinforcing band 18 at the junction of housing segments 14 and 16 extends around the housing and is secured by a series of bolts or pins 20 to reinforce the junction of housing parts 14 and 16. Reinforcing band 18 is necessary because of the presence of a slot 21 in housing segment 16 for passage of a reaction arm (to be discussed hereinafter). The housing segments define a central passageway 22 which has an enlarged lower end 24. The wrench has a carrying handle 11 and a hoist eye 13.

The wrench has a square input socket 26 located in a recess or pocket 28 in housing segment 12. Input socket 26 is connected by a shear pin 30 to a shaft 32 which is supported by thrust and ball bearings as shown. Shear pin 30 serves to protect the gear system of the wrench against overload in the event a powered fast run-down is used on the wrench and results in an unintentional overload, or overload from any other cause. In the event of an overload, pin 30 will shear to protect the gear system.

A 45° helical gear 34 is fixed to shaft 32 and rotates with shaft 32 in response to input to socket 26. Gear 34 meshes with and drives a second 45° helical gear 36 to effect 90° turn in the direction of input rotation. Gear 36 is mounted and fixed to a shaft 38 which is supported by bearings as shown and which includes a worm 40. Worm 40 meshes with and drives worm gear 42 to effect a second 90° turn in input direction whereby rotation is now parallel to the axis of shaft 32.

Worm gear 42 is splined to a shaft 44 which is supported by bearings as shown. The lower part of shaft 44 is expanded to form a planetary cage 46 having upper and lower annular plates 48 and 50. Planetary cage 46 holds four planet cluster gears 52, each of which is mounted by bearings on and rotatable on a shaft 54. Each cluster gear 52 is made up of an upper gear 52(*a*) and a lower gear 52(*b*) which are joined together and rotate in unison. The lower planetary gears 52(b) mesh with an internal ring or sun gear 56 which has formed at the lower end thereof an annular internal output spline 58 located radially inboard of sun gear 56. Spline 58 is supported by a bushing 60. Sun gear 56 and spline 58 constitute the output of the wrench. A pair of conventional reaction pins 61 extend from the body of the wrench adjacent and radially outboard of output spline 58. As will be apparent to and understood by those of ordinary skill in the art, the gear train from between input socket 26 and output spline 58 is a force multiplier, whereby the torque output at spline 58 is multiplied relative to the input to socket 26.

Figure 4:
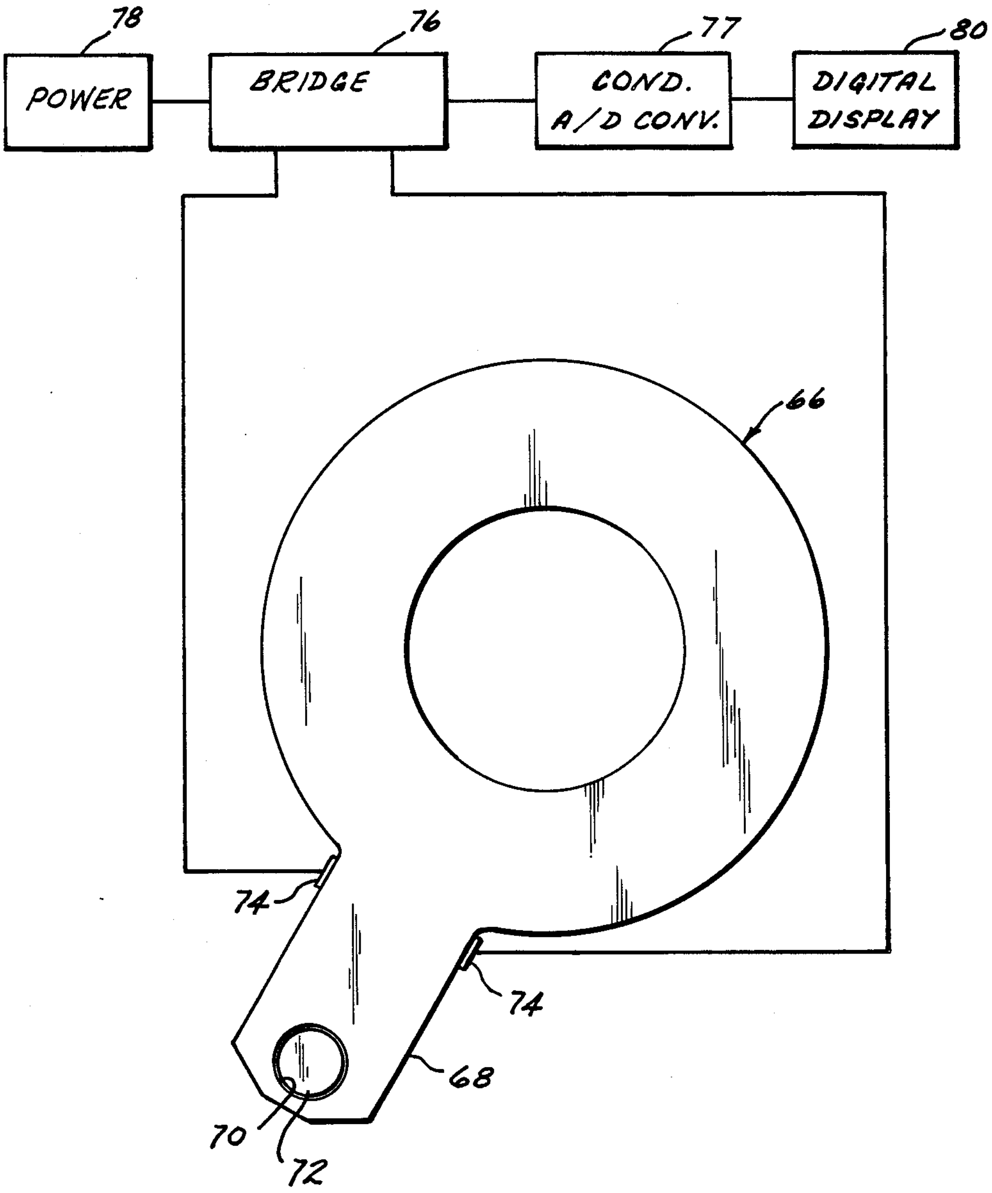
FIG. 4 is a detail of the single arm reaction system.

The upper planetary gears 52(*a*) (which are unitary with and rotate with the lower planetary gears 52(*b*)) mesh with a second internal ring gear 62 which is a reaction gear forming part of the reaction system. Reaction gear is separate from (i.e., moves independently of) output ring gear 56 and gear 62 is supported on a bushing 64 to prevent drag of reaction gear 62 on housing 16. Reaction gear 62 is welded to an annular reaction plate 66 which has a single radially extending reaction arm 68 projecting therefrom (see also FIG. 4). Reaction arm 68 extends through slot 21 in housing segment 16. Arm 68 has a hole 70 therethrough, and a reaction pin 72 which is securely housed in housing segment 14 extends into hole 70. The diameter of hole 70 is slightly greater (about 0.015 inches) than the diameter of pin 72. A cover plate 69 attached to housing segment 16 protects arm 68 where it projects through housing segment 16.

When the wrench is operated to cause output gear 56 and spline 58 to impose a torque load on a fastener or other item, the torque load is reacted through gear 52(*a*) and gear 52(*b*), reaction gear 62, plate 66 and arm 68 to close the gap between the hole 70 in arm 68 and pin 72. After the 0.015 clearance between hole 70 and pin 72 is reduced to zero, a load is then imposed on arm 68 in proportion to the torque load being delivered to the item to be torqued. Strain gages 74 (two on each side of arm 68) are appropriately positioned at the high stress area of the junction of arm 68 with plate 66 to sense and measure the strain in arm 68 to determine the torque load. The resistance of the strain gages varies in proportion to the torque load as the arm 68 is strained. The four strain gages 74 are connected together to create a conventional bridge 76, that when excited from a power supply 78, outputs a voltage directly proportional to the load on the arm 68. This bridge 76 is connected to signal conditioning and analog to digital circuits 77, the output of which is connected to a digital display 80. The signal conditioning circuit allows for scaling of the bridge output for direct torque readout on the display 80.

The use of a single reaction arm is a particularly important feature of the present invention in that it avoids the complexities of a dual reaction arm system and the need to position and accommodate two reaction arms; and it makes it feasible to incorporate the reaction arm as an internal part within the envelope of the housing of the present invention. It has heretofore been thought that the force balance of a two reaction arm system was required for high torque mechanical wrench systems. The fact that a single reaction arm system was operable and reliable for the high torque (up to 1500 ft./lbs.) wrench of this invention was an important feature and aspect of this invention.

A thin inner sleeve 82 is fastened at a flange 84 to output gear 56, and sleeve 82 and extends through center passage 22 to the upper surface of the wrench. A pointer 86 is friction fit onto sleeve 82, and pointer 86 cooperates with an angular protractor 87. A frequently desired torquing practice is to torque a fastener until a predetermined desired level of torque has been reached, and then the fastener is rotated another predetermined number of degrees to complete the tightening operation. With the present wrench, when the predetermined desired torque level is displayed in digital display 80, pointer 86 is manually set to 0° on protractor 87, and operating input is then delivered to the wrench until the item being torqued is moved the predetermined number of degrees to complete the tightening operation. The protractor numbering is displayed in two directions to accommodate clockwise and counterclockwise motion to tighten depending on thread direction.

Figure 5:
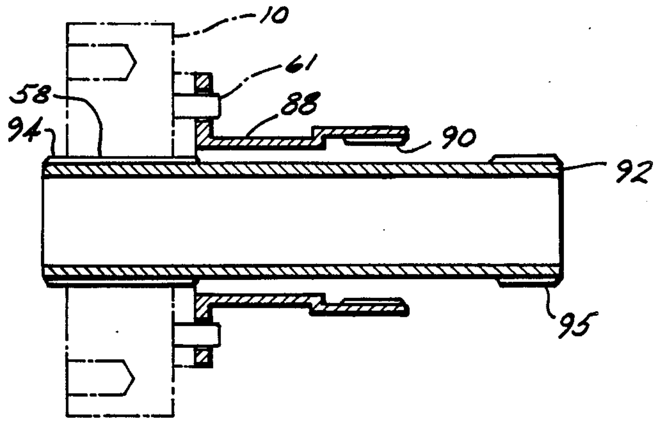
FIG. 5 is a schematic showing the first mode of operation of the wrench.
Figure 6:
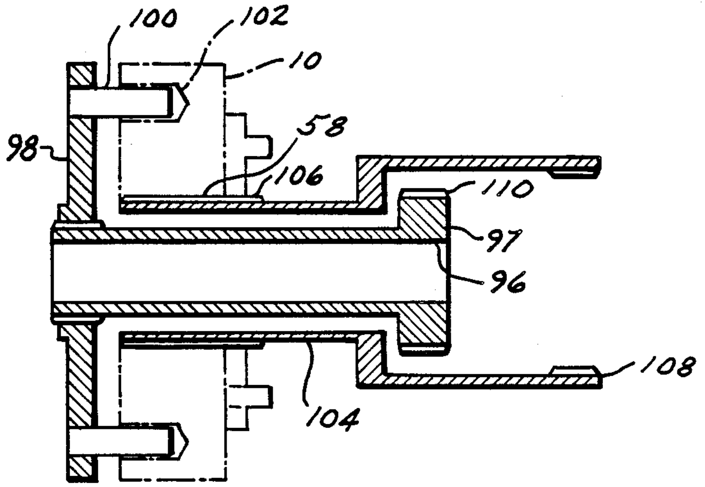
FIG. 6 is a schematic showing the second mode of operation of the wrench.

Referring now to FIGS. 5 and 6, two different operating modes of the wrench of this invention are illustrated. In FIG. 5, the wrench 10 is grounded for reaction by reaction pins 61 or, as is more likely with this wrench, by an adapter 88 which is attached to pins 61 at one end and which has a spline 90 (either internal as shown or external) at the other end to attach to a ground element such as an externally splined engine part. A torque adapter 92 with an external spline 94 at one end is attached to output spline 58, and the other end of adapter 92 has a spline 95 or other drive element such as a socket (either external or internal as may be required) to connect to and drive a fastener or other element to be torqued. Torque adapter 92 is located radially inboard of grounding adapter 88.

In FIG. 6, a second operating mode of the wrench of this invention is shown. In this mode, the wrench is grounded for reaction by a reaction adapter 96 which is in the form of a tube or shaft which extends through central passageway 22 and is splined or otherwise connected at the upper end to a pair of arms 98 having reaction pins 100 which seat in a pair of reaction holes 102 (see FIG. 1) in body segment 12 at the top of the wrench. The lower end of reaction adapter 96 has a spline 110 (either external or internal as may be required) or some other element to connect to and ground on an element such as a grounded engine part. A torque adapter 104 is connected at one end by a spline 106 to output spline 58, and the other end 108 of torque adapter 104 has a spline or other drive element (either external or internal as may be required) to connect to and drive a fastener or other element to be torqued.

An important feature and advantage to be noted is that in either mode of operation, the output of the wrench is in the same direction as the input.

It will be noted that the schematics of FIGS. 5 and 6 do not show relative distances between the lower ends of the reaction and torque adapters. It will, however, be understood that the relative lengths of those adapters will depend on the locations of the ground connection and the item to be torqued. It will also be noted that because of the spline connection at output spline 58 and the axial length of upper reaction pins 100 and reaction holes 102, axial adjustments can be made in the placement of the reaction and torque adapters as may be needed.

The wrench of the present invention is particularly useful in torque applications internal of jet engines. However, the wrench is not limited to such uses.

While preferred embodiments have been shown and described, various modifications and substitutions may be made thereto without departing from the spirit and scope of the invention. Accordingly, it is to be understood that the present invention has been described by way of illustrations and not limitation.

What is claimed is:

1. A torque wrench including:

housing means;

gear train means within and supported by said housing means for providing multiplication of an input to the torque wrench;

input means connected to said gear train means to deliver an input to the torque wrench;

output means connected to a part of said gear train means for delivering a torque load to an item to be torqued;

first reaction means associated with a first part of said housing means for connecting the torque wrench to a reaction surface in a first mode of operation of the torque wrench;

second reaction means associated with a second part of said housing means for connecting the torque wrench to a reaction surface in a second mode of operation of the torque wrench;

said first and second modes of operation being mutually exclusive;

said second reaction means including a passage through said output means and through the torque wrench; and reaction measuring means connected to said part of said gear train means for measuring the torque load delivered to an item to be torqued.

2. A torque wrench as in claim 1 wherein in said first mode of operation the wrench includes:

a torque adapter connected to and extended from said output means;

a first reaction adapter connected to and extending from said first reaction means; and said torque adapter being located inboard of said first reaction adapter.

3. A torque wrench as in claim 1 wherein said second mode of operation the wrench includes:

a torque adapter connected to and extending from said output means;

a second reaction adapter connected to and extending from said second reaction means through said wrench and said torque adapter; and said torque adapter being located outboard of said second reaction adapter.

4. A torque wrench as in claim 1 wherein:

said reaction measuring means includes a rotatable plate connected to said part of said gear train means;

a single arm extending from said plate;

interacting means between said arm and said housing means for limiting movement of said arm; and sensing means to sense the load on said arm.

5. The torque wrench of claim 4 wherein said interacting means includes:

a hole in said arm;

a pin connected to and extending from said housing means into said hole in said arm; and the size of said hole being slightly larger than the size of said pin.

6. The torque wrench of claim 4 wherein:

said sensing means is strain gages mounted on said arm; and including a bridge connected to said strain gages to determine the reaction load on said arm.

7. The torque wrench of claim 1 wherein:

said input means is rotatable and operates in the same sense of rotation for operation of the torque wrench in either the first or second mode of operation thereof.

8. A torque wrench including:

housing means;

longitudinal passage means through said housing means;

gear train means within and supported by said housing means for providing multiplication of an input to the torque wrench, said gear train means including planetary cage means around said longitudinal passage means and planetary gear means housed in said planetary cage means;

input means connected to said gear train means to deliver an input to the torque wrench;

output means drivingly connected to said planetary gear means for delivering a torque load to an item to be torqued;

first reaction means for connecting the torque wrench to a reaction surface in a first mode of operation of the torque wrench, said first reaction means including reaction elements on a first part of said housing means associated with and outboard of said output means;

second reaction means for connecting the torque wrench to a reaction surface in a second mode of operation of the torque wrench, said second reaction means including reaction elements on a second part of said housing means remote from said first part;

said first and second modes of operation being mutually exclusive;

second mode adapter means for use with said second reaction means when said second reaction means is used, said second mode adapter means extending through said longitudinal passage means for connection to said second reaction means; and reaction measuring means connected to said planetary gear means for measuring the torque load delivered to an item to be torqued.

9. A torque wrench as in claim 8 wherein in said second mode of operation the wrench includes:

a torque adapter means connected to and extending from said output means for connection to an item to be torqued; and said torque adapter means being located outboard of said second mode reaction adapter means.

10. A torque wrench as in claim 8 wherein in said first mode of operation the wrench includes:

torque adapter means connected to and extending from said output means for connection to an item to be torqued;

first mode reaction adapter means connected to and extending from said first reaction means; and said torque adapter means being located inboard of said first mode reaction adapter means.

11. A torque wrench as in claim 8 wherein:

said planetary gear means includes a plurality of gears each having a first gear and a second gear connected together;

each of said first gears being connected to said output means and each of said second gears being connected to said reaction measuring means.

12. A torque wrench as in claim 11 wherein said reaction measuring means includes:

a rotatable plate supported in said housing means and reaction gear means fixed to said plate;

said reaction gear means meshing with each of said second gears;

a single arm extending from said plate;

interacting means between said housing means and said arm for limiting movement of said arm; and sensing means to sense the load on said arm.

13. The torque wrench of claim 12 wherein said interacting means includes:

a hole in said arm;

a pin connected to and extending from said housing means into said hole in said arm; and the size of said hole being slightly larger than the size of said pin.

14. The torque wrench of claim 12 wherein:

said sensing means is strain gages mounted on said arm; and including a bridge connected to said strain gages to determine the reaction load on said arm.

15. A torque wrench as in claim 12 wherein:

said plate is generally circular and has a central opening, said longitudinal passage means extending through said central opening.

16. A torque wrench as in claim 11 including:

indicator means connected to said output means and passing through said longitudinal passage means to provide an indication of rotation of said output means at said second part of said housing means.

17. A torque wrench as in claim 16 wherein said indicator means includes:

a tube connected to said output means and extending through said longitudinal passage means;

pointer means mounted on said tube; and indicia of rotation on said second part of said housing means.

18. A torque wrench as in claim 8 wherein:

said input means is rotatable and operates in the same sense of rotation for operation of the torque wrench in either the first or second mode of operation thereof.

* * * * *